United States Patent [19]
Gillette

[11] Patent Number: 5,509,575
[45] Date of Patent: Apr. 23, 1996

[54] FLOW DIVIDER AND METHOD

[75] Inventor: Harold R. Gillette, Grand Rapids, Mich.

[73] Assignee: Partnership of Gillette & Nagel, Grand Rapids, Mich.

[21] Appl. No.: 268,499

[22] Filed: Jun. 30, 1994

[51] Int. Cl.$^6$ .................................................... G01F 11/00
[52] U.S. Cl. ................... 222/1; 222/219; 222/334
[58] Field of Search .................................. 222/216–219, 222/334, 136, 249, 250, 145.1, 145.5, 1; 239/98, 99, 563

[56] References Cited

U.S. PATENT DOCUMENTS

| | | | |
|---|---|---|---|
| 734,258 | 7/1903 | Petters | 222/219 X |
| 1,049,478 | 1/1913 | Hedgcock | 222/219 |
| 2,427,680 | 9/1947 | Leonard | 222/219 X |
| 2,558,376 | 6/1951 | Opp et al. | 239/563 X |
| 2,783,922 | 3/1957 | Vogt . | |
| 2,787,972 | 4/1957 | Vogt . | |
| 2,858,775 | 11/1958 | Marasso . | |
| 2,946,488 | 7/1960 | Kraft | 222/334 X |
| 3,167,398 | 1/1965 | Whittington | 222/219 X |
| 3,172,578 | 3/1965 | Kemp | 222/219 |
| 3,387,748 | 6/1968 | Brenchley | 222/219 X |
| 3,489,104 | 1/1970 | Wolff . | |
| 4,391,576 | 7/1983 | Cummins . | |
| 4,462,740 | 7/1984 | Cytra . | |
| 4,573,898 | 3/1986 | Jones et al. . | |
| 4,684,040 | 8/1987 | Jonovic et al. . | |
| 4,773,565 | 9/1988 | Rohlfing et al. | 222/219 X |
| 5,039,295 | 8/1991 | Cheung . | |
| 5,211,968 | 5/1993 | Judex . | |
| 5,368,195 | 11/1994 | Pleet et al. | 222/219 X |

FOREIGN PATENT DOCUMENTS

| | | | |
|---|---|---|---|
| 4220659 | 1/1993 | Germany | 222/219 |

*Primary Examiner*—Kevin P. Shaver
*Attorney, Agent, or Firm*—Price, Heneveld, Cooper, DeWitt & Litton

[57] ABSTRACT

A flow divider for substantially eliminating fluid intensification problems and pressure surges includes a housing having an inlet, one or more outlets, and a cavity therebetween. A passageway defining spool is rotatably mounted in the housing cavity and includes passageways corresponding to the outlets that separately periodically connect the inlet to the outlets as the spool is rotated. "Floating" pistons are slideably mounted in the passageways such that the pistons reciprocate in the passageways as the spool is rotated. Specifically, the incoming hydraulic fluid pushes the pistons in the passageways away from the inlet toward the outlet causing a metered volume of pressurized fluid to be moved out of the passageways through the respective outlets and, as the spool is further rotated, the passageways become reversed such that the pistons are again positioned adjacent the inlet and are again forced away from the inlet. Thus, pressurized fluid is dispensed at a predetermined rate and proportion. Various embodiments are disclosed, including a dual output hydraulic fluid flow divider, a triple output hydraulic fluid flow divider with integral motor, a paired input/output flow divider, and an agricultural sprayer including a flow divider.

38 Claims, 6 Drawing Sheets

FLOW DIVIDER AND METHOD

BACKGROUND OF THE INVENTION

The present invention concerns fluid flow dividers, and in particular concerns a positive displacement fluid flow divider for delivering proportionate amounts of volumetric pressurized fluid to fluid utilizing devices. For example, the present invention includes, but is not limited to, a positive displacement flow divider that delivers proportionate amounts of hydraulic fluid to cylinder assemblies to simultaneously extend pistons/rods in the cylinder assemblies at coordinated and predetermined rates.

It is known to deliver equal volumes of hydraulic fluid to tandem cylinders to simultaneously extend pistons/rods operably mounted in the cylinders. For example, positive displacement gear-type flow dividers are sometimes used for this purpose. However, if one of the pistons/rods bottoms out before the other before the flow divider is stopped, the known flow dividers cause severe pressure spikes and shocks and fluid intensification in branches of the hydraulic system. A bypass or relief valve can be operably connected to the cylinders; however the relief valves do not eliminate the pressure spikes and shocks but only compensate to relieve the over-pressures once they occur. Further, the relief valves are susceptible to misadjustment and/or malfunction without warning. The unbalanced pressures caused by pressure spikes and shocks cause premature seal wear and high system maintenance, even if a relief valve is used.

Thus, a device solving the aforementioned problem is desired.

SUMMARY OF THE INVENTION

The present invention includes a flow divider for delivering metered amounts of liquid under pressure to a liquid utilizing device. The flow divider includes a housing having an inlet and a pair of outlets. A passageway defining spool is rotatably mounted in the housing, and includes passageways for intermittently connecting the housing inlet to the outlets as the spool is rotated. Specifically, as the passageways move into position connecting the inlet to the outlets, the incoming pressurized liquid pushes the pistons in the passageways away from the inlet toward the outlet, causing a first proportional amount of volumetric liquid to be ejected from each passageway out of the respective outlets. As the spool further rotates, the passageways are reversed such that the pistons are again positioned adjacent the inlet, and the process is repeated. The continued rotation of the spool thus causes continuing proportionate amounts of volumetric liquid under pressure to be delivered.

These and other features and advantages of the present invention will be further understood and appreciated by those skilled in the art by reference to the following specification, claims and appended drawings.

DETAILED DESCRIPTION OF THE PREFERRED EMBODIMENTS

A flow divider assembly 20 (FIGS. 1–2) embodying the present invention includes a housing 22 having an inlet 24 connected to a source of pressurized hydraulic fluid 25, and a pair of outlets 26 and 28 connected to a fluid utilizing device 29 including cylinders/extendable rods 29' and 29". A passageway defining member or spool 30 rotatably mounted in the housing 22. Spool 30 includes passageways 32 and 34 that separately periodically connect inlet 24 to outlets 26 and 28 as spool 30 is rotated. Pistons 36 and 38 are slideably mounted in passageways 32 and 34, respectively, so that pistons 36 and 38 reciprocate in the passageways as spool 30 rotates. Specifically, the incoming hydraulic fluid pushes pistons 36 and 38 in respective passageways 32 and 34 away from inlet 24 toward respective outlets 26 and 28. This causes a proportionate metered volume of pressurized fluid to be forced out of passageways 32 and 34 through respective outlets 26 and 28. As spool 30 further rotates, passageways 32 and 34 are reversed, such that respective pistons 36 and 38 are again positioned adjacent inlet 24 and are again forced along the respective passageways 32 and 34. Notably, if the output hydraulic pressure equals the input hydraulic pressure, the piston affected stops moving. Thus, the operating pressure in the hydraulic system of flow divider assembly 20 is automatically limited to the operating pressure of the source of pressurized hydraulic fluid 25, and uncontrolled pressure spikes and shocks on the system are controlled or eliminated, even though the flow divider 20 is a positive displacement type flow divider.

Housing 22 (FIGS. 1–2) is a block of material including a cylindrically-shaped bore or cavity 48 for receiving spool 30. Inlet 24 includes an inlet section 49 bored into an exterior side of housing 22, and a transverse branch 50 bored perpendicularly to inlet section 49 and connected to inlet section 49. Secondary inlet branches 54 and 56 extend from the surface of bore 48 into transverse branch 50 in a direction generally parallel to inlet section 49. Outlets 26 and 28 are drilled in the opposite side of housing 22 generally in line with secondary inlets 54 and 56. In the manufacture of housing 22, outlet 26 and secondary inlet 54 are aligned so that they can both be formed by a single drill in a single boring operation. Similarly, inlet 56 and outlet 28 are aligned. The end 58 of transverse branch 52 is covered by a plug 83 so that pressurized hydraulic fluid 40 is forced to travel along a path from inlet 24 and branch 50 to inlets 54 and 56. Inlet 24 includes pipe threads for a liquid tight connection to source 25 and outlets 26 and 28 also include pipe threads for secure connection to hydraulic lines leading to cylinders 29' and 29".

Passageway defining spool 30 (FIG. 2) is a generally cylindrically-shaped body including the transverse bores defining passageways 32 and 34. Notably, passageways 32 and 34 are shown as being aligned, although they could be angled rotationally relative to each other if desired to provide sequential output. Spool 30 rotates about an axis 64 defined by a protrusion 66 at one end and a drive shaft 68 at the other end. A motor 70 (FIG. 1) is connected to drive shaft 68 for rotating spool 30. Bearings 72 and 74 are mounted on protrusions 66 and 68, respectively. An end cap 76 is bolted to one end of housing 22 by bolts 77 and includes a depression 78 that mateably frictionally engages and supports bearing 72. O-rings 82 are compressed between end cap 76 and housing 22 to provide an oil tight seal between end cap 76 and housing 22.

At the opposite end of housing 22, a drive end cap 84 (FIG. 1) is attached to housing 22 by bolts 86. Drive end cap 84 includes an aperture 88 for receiving drive shaft 68 and a depression 89 for supporting drive shaft bearing 74. A seal 90 fits around drive shaft 68 and within a depression 94 in drive end cap 84. Seal 90 includes a resilient flexible member that slideably engages drive shaft 68 to prevent leakage of hydraulic fluid around drive shaft 68. An O-ring 96 is located between end cap 84 and housing 22 to prevent leakage of hydraulic fluid around the perimeter of end cap 84. A "ladder" shaped seal 98 including circumferential sections 99 and axial sections 100 is positioned in channels around spool 30. Seal sections 99 and 100 form sealed boundaries around opposing ends of passageway 32 such that they reduce or eliminate leakage of hydraulic fluid between spool 30 and the bore 48 of housing 22. This prevents undesirable leakage of hydraulic fluid between inlet 24 and outlets 26 and 28.

Figure 2:
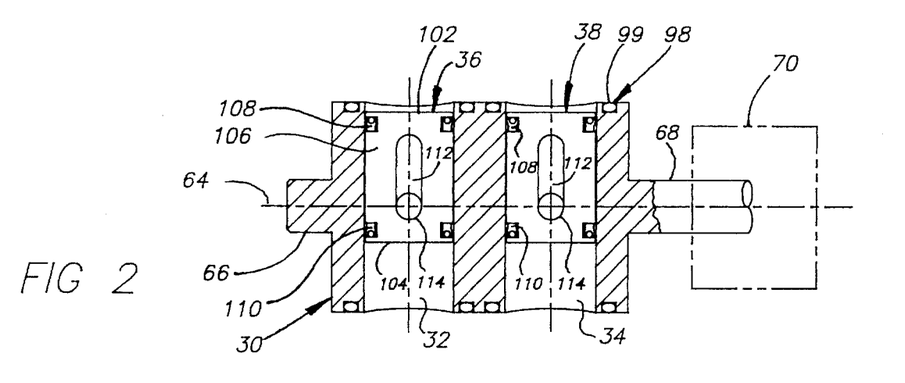
FIG. 2 is a cross-sectional view of the spool shown in FIG. 1A.
Figures 3, 4:
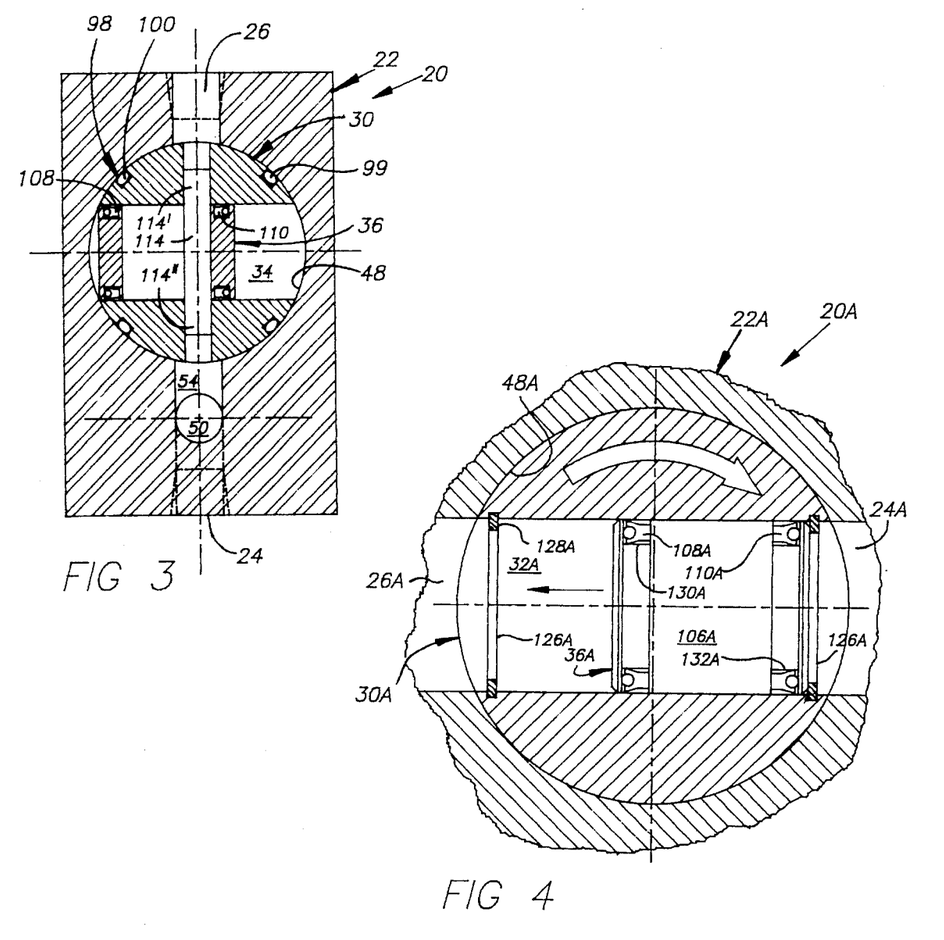
FIG. 3 is a cross-sectional view of the flow divider taken along the plane III—III in FIG. 1.
FIG. 4 is an enlarged, fragmentary, cross-sectional view of an alternative flow divider embodying the present invention.

Pistons 36 and 38 are identical and thus only piston 36 will be described hereinafter. Piston 36 (FIG. 2) is a cylindrically-shaped member including generally planar shaped ends 102 and 104 and a cylindrically-shaped outer surface 106. Seals 108 and 110 are located proximate the ends of piston 36 on outer surface 106 generally adjacent piston ends 102 and 104. An elongated slot 112 is formed longitudinally in piston 36 between seals 108 and 110. A dowel 114 is extended through slot 112 in piston 36, and opposing ends 114' and 114" (FIG. 3) of dowel 114 are frictionally retained in spool 30. Dowel 114 is located fully within spool 30 so that it does not interfere with the rotation of spool 30. Dowel 114 engages the ends of slot 112 and limits the travel of piston 36 in passageway 32 as piston 36 travels back and forth within passageway 32.

In operation, pressurized hydraulic fluid 40 enters inlet 24 and flows through transverse branch 50 and secondary inlet 54 into passageway 32 forcing piston 36 to the inlet remote end of passageway 32. As piston 36 moves to the inlet remote end of passageway 32, hydraulic fluid within passageway 32 is forced out of outlet 26 under pressure to the pressurized hydraulic fluid using device 29'. Simultaneously, hydraulic fluid 40 flows through transverse branch 50 and secondary inlet 56 into passageway 34, thus forcing piston 38 to the inlet remote end of passageway 34. As piston 38 moves to the inlet remote end of passageway 34, hydraulic fluid within passageway 34 is forced under pressure out of outlet 28 to pressurized hydraulic fluid utilizing device 29". Thus, the devices 29' and 29" are moved simultaneously the same distance.

As spool 30 is rotated by motor 70 and drive shaft 68, passageways 32 and 34 are rotated 180° such that pistons 36 and 38 are again positioned adjacent secondary inlets 54 and 56. Pressurized hydraulic fluid 40 again forces pistons 36 and 38 along the length of passageways 32 and 34, thus forcing hydraulic fluid located in passageways 32 and 34 out of the passageways under pressure through respective outlets 26 and 28 to devices 29' and 29", respectively.

Notably, if hydraulic fluid flow is deadheaded or stopped in one of outlets 26 and 28, such as if one of the fluid utilizing devices 29' or 29" bottoms out, the respective piston 36 or 38 stops moving because the pressure of incoming hydraulic fluid flow is equal to the downstream pressure. Thus, system pressure is automatically limited to the operating pressure of supply 25, and excessive pressure spikes, high pressure and undesirable fluid intensification which cause excessive wear and slippage on the seals of pistons 36 and 38 and on the system of flow dividers 20 are avoided. At the same time, the other piston/outlet continues to feed the utilizing device (29' or 29") which has not yet bottomed out. Because of this automatic pressure limiting feature and the overall construction, it is contemplated that flow divider 20 can be operated at a wide range or pressures, such as from 50 psi to 5,000 psi or higher.

Figure 7:
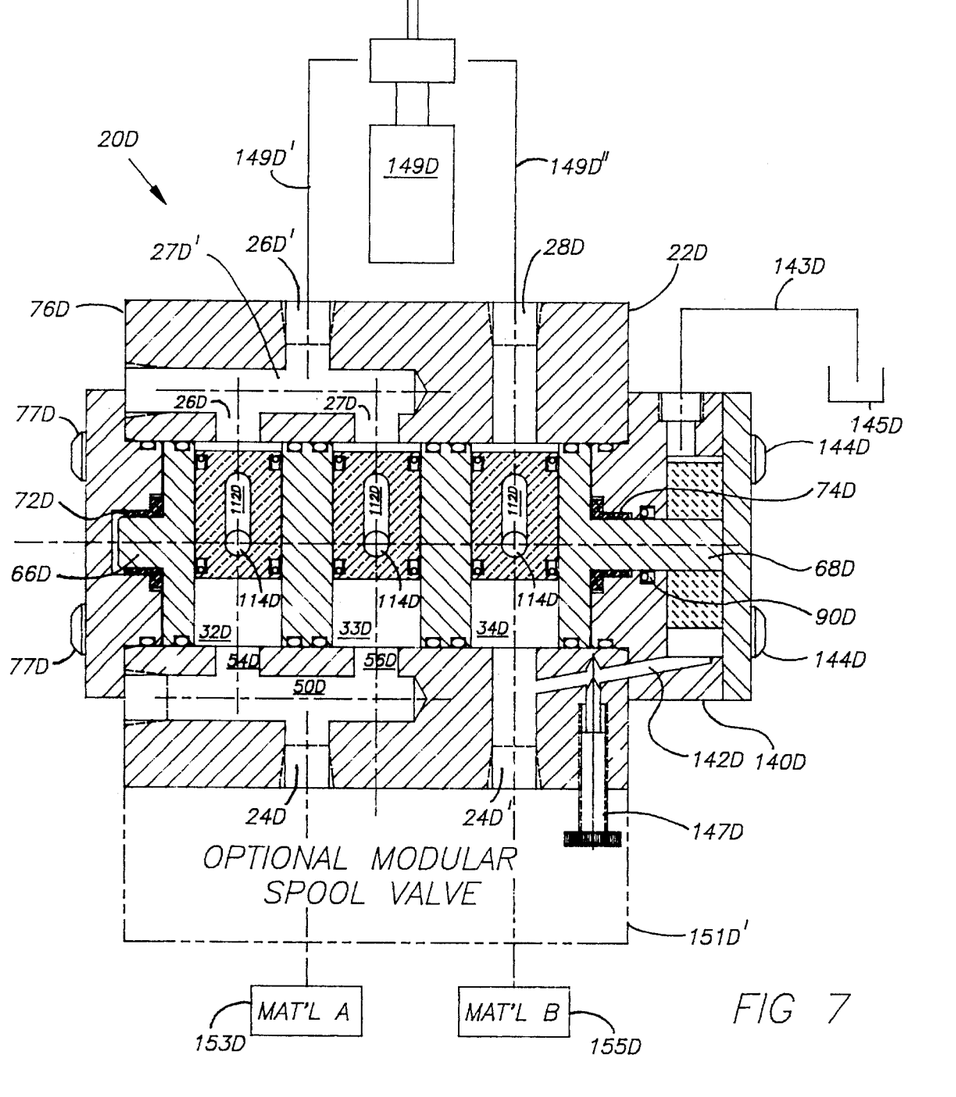
FIG. 7 is a cross-sectional view of an alternative dual output flow divider embodying the present invention for use in mixing two part chemicals.

Notably, it is contemplated that flow divider 20 can be used on a number of different fluids other than hydraulic fluids, such as chemicals, lubricants, water-based products, and two-component reactive materials such as epoxies or reaction injection molded urethane materials. For example, the fluid utilizing device 29 can be a mixing head for a reaction injection molding (RIM) process, such as is shown in FIG. 7 and described below. Also, as a further example, a servo controlled mechanism could be used that rotates spool 30 a desired number of turns, thus raising a horizontal work surface or table a desired predetermined distance. Notably, once the spool 30 is stopped, the table is held level and at the predetermined height.

A number of variations and alternative embodiments are contemplated to be within the scope of the present invention. In order to reduce redundant discussion, comparable elements of the alternative embodiments are identified with identical numbers but with the addition of the letters "A," "B," "C," etc.

A flow divider 20A (FIG. 4) embodying the present invention includes a housing 22A having a bore defining a cavity 48A therein, and a spool 30A rotatably located in bore 48A. At least one inlet 24A and one outlet 26A extend into bore 48A, such that passageway 32A intermittently connects inlet 24A and outlet 26A. Piston 36A is slideably located within passageway 32A in spool 30A. A pair of snap rings 126A are located in ring-shaped depressions 128A at the ends of passageway 32A to limit the stroke of piston 36A. Piston 36A reciprocates between snap rings 126A as spool 30A is rotated and incoming fluid drives piston 36A reciprocatingly back and forth in passageway 32A. Seals 108A and 110A are located in depressions 130A and 132A, respectively, in piston 36A near piston ends 102A and 104A.

Figure 5:
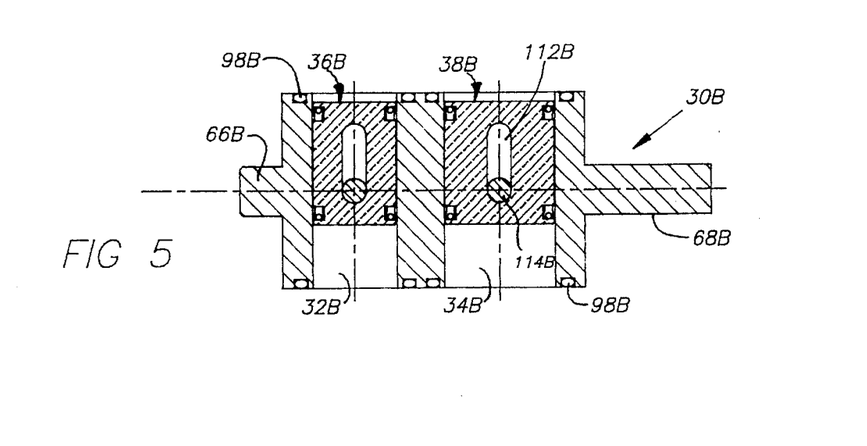
FIG. 5 is a cross-sectional view of a replacement spool for the flow divider shown in FIG. 1, the spool including two different diameter bores for providing an output having a predetermined ratio.

Spool 30 can be removed and replaced with another spool such as spool 30B (FIG. 5). The number, size and length of passageways in replacement spool 30B can be varied as desired. For example, the illustrated piston 36B has a smaller diameter than piston 38B and thus provides a smaller volume per stroke. Thus, by changing spools, ratios of output can be easily and quickly changed.

Figure 6:
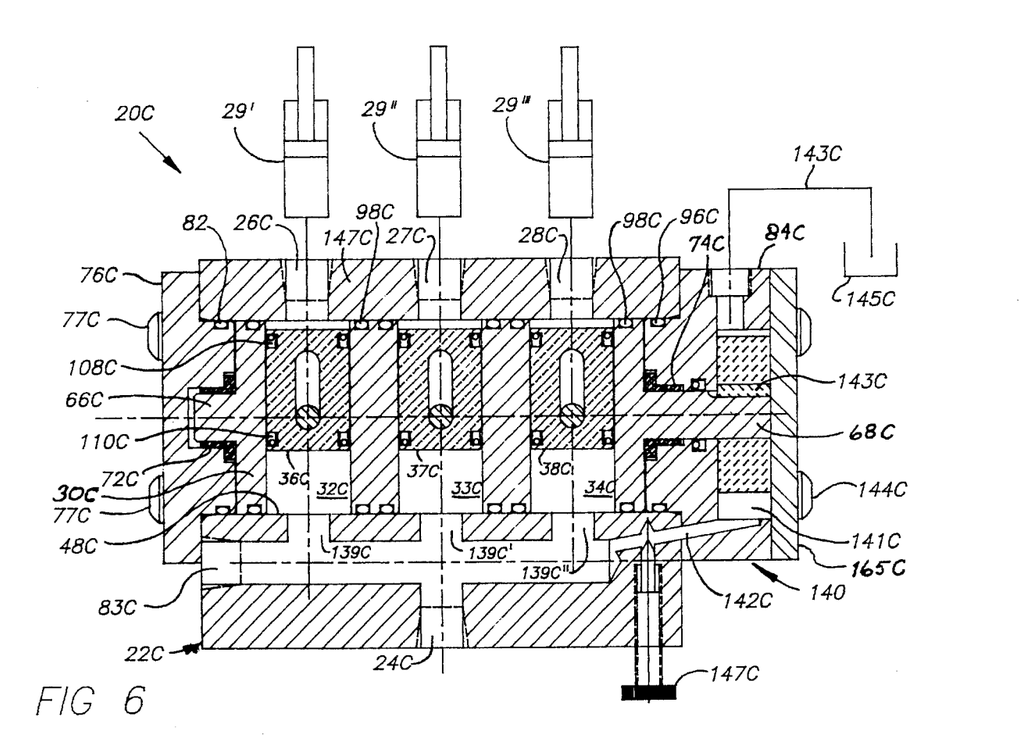
FIG. 6 is a cross-sectional view of an alternative triple output flow divider including an integral motor embodying the present invention.

A flow divider 20C (FIG. 6) embodying the present invention includes a housing 22C having a bore defining a cavity 48C, an inlet 24C, and three outlets 26C, 27C and 28C. Three-branched sub-inlets 139C, 139C', and 139C" are connected to inlet 24C, and are positioned to intermittently align with outlets 26C–28C as spool 30C is rotated. Spool 30C includes three passageways 32C, 33C and 34C, with pistons 36C, 37C and 38C being operably mounted therein. Seals 108C and 110C are located at either end of pistons 36C, 37C and 38C and also seal 98C is located on spool 30C between spool 30C and cavity 48C to prevent leakage therebetween. A hydraulic motor or vane pump 140C is mounted on the drive shaft 68C by keyway 143C and is captivated between the drive shaft end cap 84C and motor cap 165C by attachment bolts 144C. A passageway 142C in housing 22C extends from inlet 24C to an end of housing 22C to which motor 140C is connected. Motor 140C includes an inlet 141C for receiving fluid from passageway 142C to drive motor 140C and includes a discharge line 143C for returning hydraulic fluid to tank 145C. An adjustable throttle valve 147C extends into passageway 142C for throttling fluid flowing to motor 140C to control the speed of motor 140C.

If it is desirable to utilize only two outlets 26C and 27C, and not outlet 28C, the third outlet 28C can be covered such that piston 38C associated with outlet 28C simply stops moving. Notably, the lack of movement by piston 38C does not adversely affect the smooth operation of flow divider 20C. It is also noted that passageways 32C and 33C (FIG. 6) could be interconnected by defining a bypass passageway in the material 147C in housing 22C between outlets 26C and 27C so that both pistons 36C and 37C feed a common outlet (27C).

Flow divider 20D (FIG. 7) is similar to flow divider 20C (FIG. 6), except that in flow divider 20D, outlets 26D and 27D are combined into a single outlet 26D' by passageway 27D'. The outlets 26D' and 28D are operably connected to a reaction injection molding (RIM) machine mix head 149D by fluid lines 149D' and 149D", and inlets 24D and 24D' are connected to pressurized supplies of component A material 153D and component B material 155D, respectively. In the RIM process, it is critical that the proper ratio of part A and part B materials be delivered to mix head 149D at the beginning of the injection cycle as well as continuously throughout the injection cycle. The positive displacement type construction of flow divider 20D facilitates this action. Also in flow divider 20D, part B material is communicated through passageway 142D to motor 140D to motivate motor 140D. A modular spool valve 151D' or other modular peripheral device such as a flow controller, accumulator, re-circulator or other device can be attached to housing 22D to facilitate operation of flow divider 20D.

Figures 8, 10, 12:
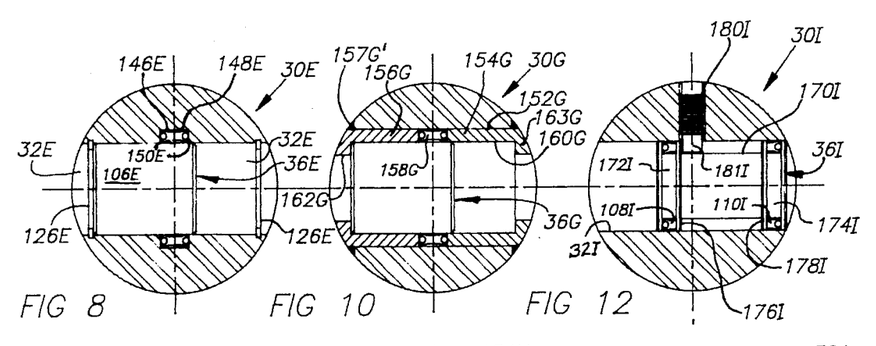
FIGS. 8–13 are cross-sectional views of alternative rotating spools and reciprocating pistons for alternative flow dividers embodying the present invention.

FIG. 8 is a cross-sectional view of a spool 30E including a passageway 32E and a piston 36E. Snap rings 126E are located at either end of passageway 32E to limit the stroke of piston 36E. A seal 146E is located in a cavity 148E in the material of spool forming passageway 32E in the center of passageway 32E. A pair of seals 146E are positioned back-to-back so that they define a pair of outwardly facing lips 150E which sealingly engage the outer surface 106E of piston 36E as piston 36E reciprocates between the ends of passageway 32E. Thus, only a single seal cavity 148E is required.

Spool 30F and piston 36F (FIG. 9) are generally identical to spool 30E and piston 36E except that, in spool 30F and piston 36F, seal 146F is positioned in the sidewall 106F of piston 36F. Thus, the passageway 32F in spool 30F is continuous and uninterrupted.

Figures 9, 11, 13:
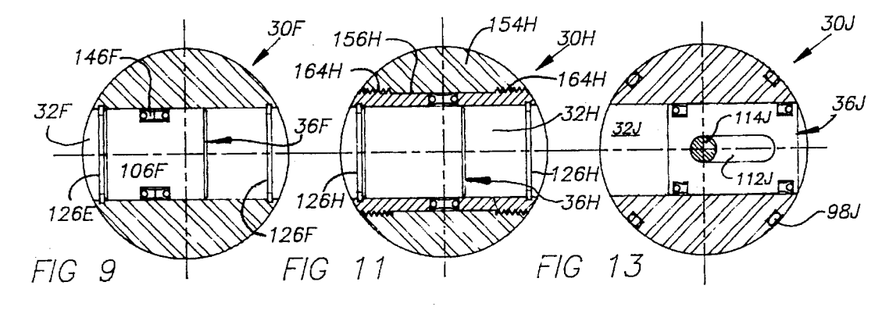

A spool 30G (FIG. 10) includes a bore 152G and a pair of sleeve-like inserts 154G and 156G which are press-fit within bore 152G and/or are welded within bore 152G by welds 157G'. Sleeve-like inserts 154G and 156G define a groove therebetween for receiving a seal 158G. The inner surfaces of sleeve-like inserts 154G and 156G define a cylindrical surface 160G for slideably receiving piston 36G. Ridges 162G and 163G are located at the outer ends of surface 160G and act as stops for limiting the reciprocation movement of piston 36G. The arrangement in FIG. 11 is comparable to that shown in FIG. 10, except that sleeve-like inserts 154H and 156H include threads 164H on an outer diameter near the outer ends for threadably engaging mating threads in the bore 152H in spool 30H.

In FIG. 12, piston 36I has a barbell shape including a shaft-like midsection 170I and enlarged end sections 172I and 174I. End sections 172I and 174I carry seals 108I and 110I for sealingly engaging passageway surface 32I. Further, enlarged end sections 172I and 174I include inner orthogonal surfaces 176I and 178I, respectively. Dowel 180I protrudes into the space defined between ends 172I and 174I adjacent shaft-like midsection 170I. The end 181I of a dowel 180I engages surfaces 176I and 178I, and thus it limits the reciprocating travel of piston 36I.

Figure 1:
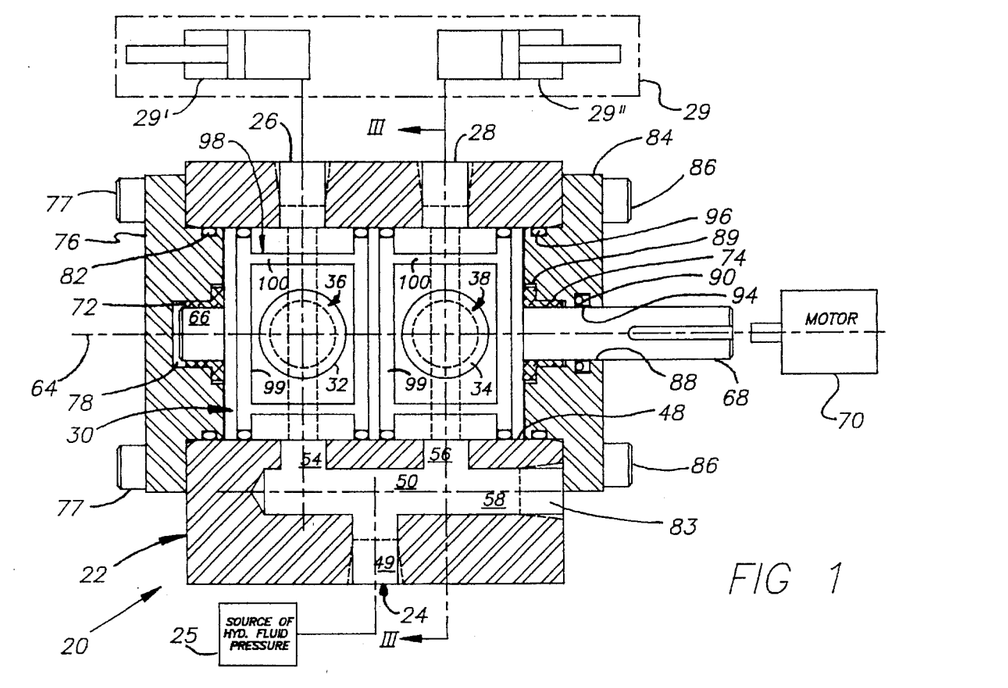
FIG. 1 is a cross-sectional view of a dual output flow divider embodying the present invention.
Figure 1A:
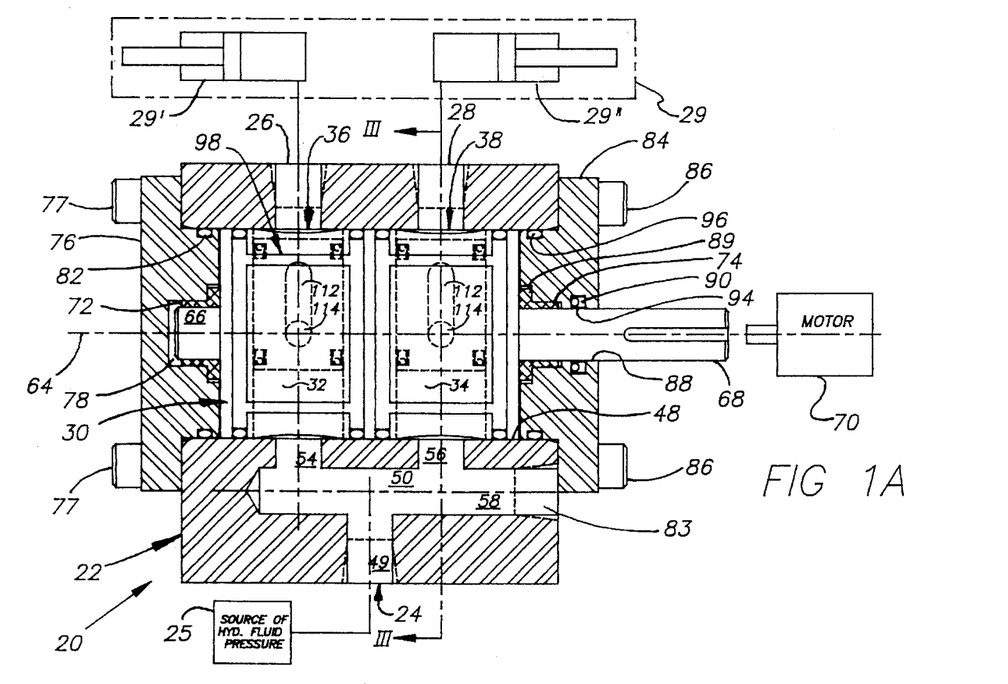
FIG. 1A is a cross-sectional view of the flow divider in FIG. 1 but with the spool rotated 90° such that the passageways in the spool are aligned with the respective inlets and outlets in the housing.

Piston 36J (FIG. 13) is identical to piston 36 (FIG. 1). However, dowel 114J extends axially in spool 30J such that a single dowel 114J limits several spools 30J. It is contemplated that different length slots 112J can be used in pistons 36J to provide different stroke lengths, and thus provide selected outputs for different pistons.

Figure 14:
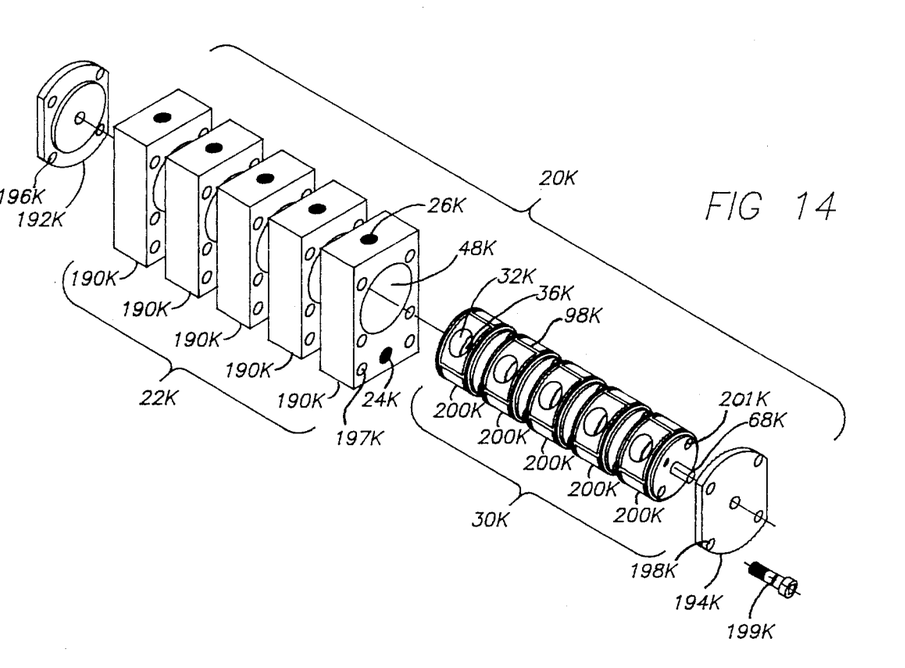
FIG. 14 is a perspective view of a modular flow divider embodying the present invention.

Flow divider 20K (FIG. 14) includes a plurality of housing sections 190K stacked together and sandwiched between end plate members 192K and 194K. Each housing section 190K includes a cavity 48K, an inlet 24K extending from cavity 48K, and an outlet 26K extending to cavity 48K. A pattern of axially aligned holes 196K, 197K, and 198K in end member 192K, housing sections 190K and second end member 194K, respectively, are configured to receive elongated tie-rod-simulating bolts 199K to secure the assembly together. Notably, inlets 24K extend axially through housing section 190K so that they communicate with each other when housing sections 190K are assembled to form housing 22K. Thus, a supply of pressurized fluid needs to be connected to only the first inlet 24K on the housing sections 90K at one end of flow divider 20K. The inlet 24K at the opposite end is plugged. Depending on the operating pressure in inlets 24K, "O" rings can be added between housing sections 190K to sealingly connect inlets 24K.

Each spool section 200K (FIG. 14) is configured to slideably fit within a cavity 48K in a selected housing section 190K. Spool sections 200K each include a passageway 32K and a piston 36K is slideably positioned therein. Seals 98K are located around the perimeter of spool sections 200K for sealingly engaging cavity 48K. Axial holes 201K receive tie rod-like bolts (not shown) that secure spool sections 200K together. A drive shaft 68K extends through spool sections 200 to rotate spool sections 200K. Drive shaft 68K extends through pistons 36K and limits their stroke (see FIG. 13). The ends of drive shaft 68K extend through end plate members 192K and 194K and a motor is connected to one end of drive shaft 68K.

Figure 15:
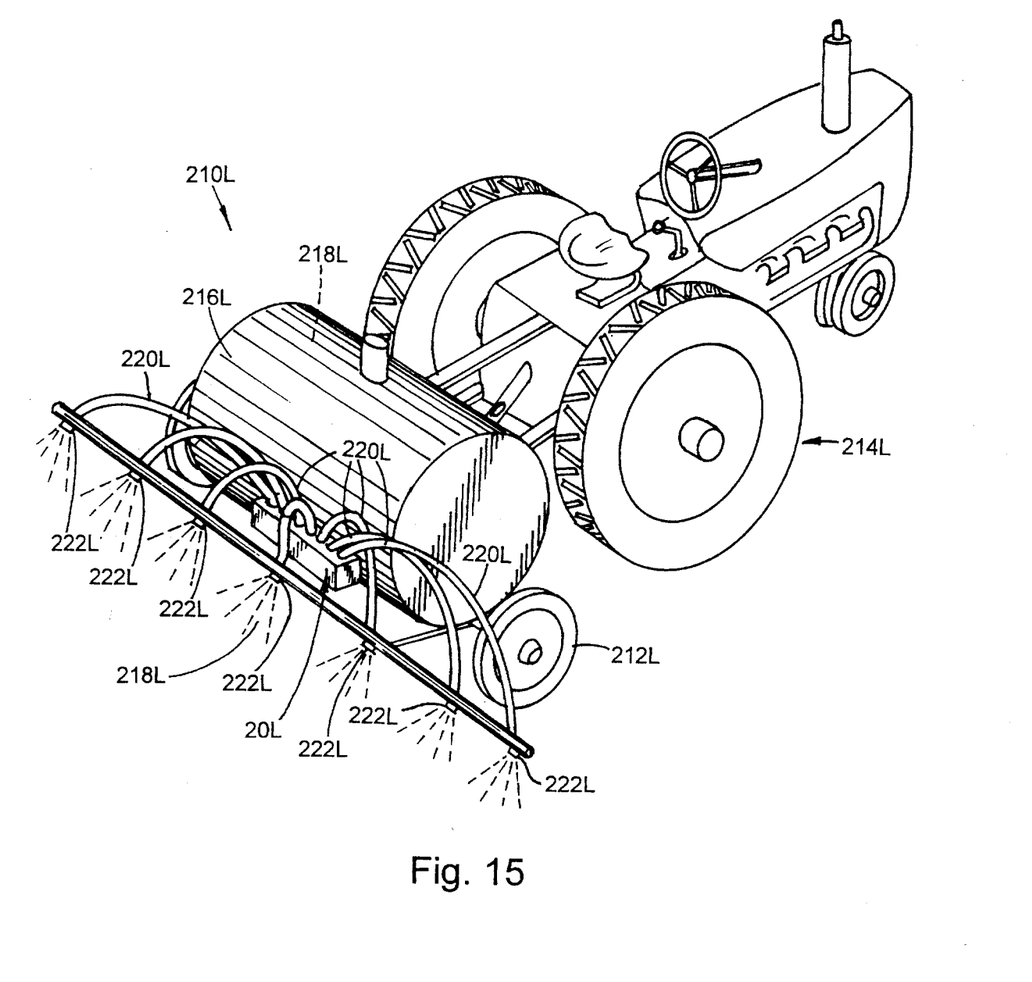
FIG. 15 is a perspective view of a flow divider used in an agricultural sprayer.

The flow dividers 20–20K are particularly useful wherein proportionate amounts of a liquid must be communicated to various locations despite unequal differential resistance to flow. In FIG. 15, an agricultural sprayer 210L is shown. Sprayer 210L is configured to spread liquid fertilizer or weed control solutions. Sprayer 210L includes a wheeled frame 212L configured to be pulled by a tractor 214L and a tank 216L of solution 218L. A flow divider 20L (for example, comparable to flow divider 20, FIG. 1; flow divider 20C, FIG. 6; or flow divider 20K, FIG. 14) is attached to frame 212L and operably connected to tank 216L for receiving solution 218L. Flow divider 20L is connected to spray heads 222L by delivery lines 220L. By pressurizing tank 216L, solution 218L is forced through flow divider 20L and dispensed through lines 220L and spray heads 222L in equal amounts, even through lines 220L are unequal in length. Notably, the spool (not specifically shown) in flow divider 20L can be driven by a power take-off on tractor 214L, by an integral motor (see FIG. 6) or by a drive system connected to the wheels of wheeled frame 212L.

Thus, there are provided positive displacement fluid flow dividers which include a housing, a rotatable passageway defining spool, and pistons mounted in the passageways in the spool for positively controlling fluid flow while simultaneously preventing pressure spikes and fluid slippage causing excessive seal wear. In the foregoing description it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A flow divider for delivering metered amounts of volumetric liquid from a source of pressurized liquid to a liquid utilizing device requiring a supply of metered volumetric liquid under pressure, comprising:

a housing including material defining an inlet configured for connection to the source of pressurized liquid, an outlet configured for connection to the liquid utilizing device, and a cavity between said inlet and said outlet;

a passageway defining member rotatably positioned in said cavity of said housing, said passageway defining member intermittently placing said inlet and said outlet in fluid communication with a passageway in said passageway defining member as said passageway defining member is rotated;

a metering piston located in said passageway, said metering piston being configured to slide reciprocatingly back and forth in said passageway;

a piston-travel-limiting member for limiting the travel of said piston in said passageway to a predetermined distance;

a drive connected to said passageway defining member for rotating said passageway defining member, whereby, by continuously rotating said passageway defining member, said passageway is repeatedly reversed by the rotation of said passageway defining member so that said piston is repeatedly located proximate the inlet and is thereafter forced by incoming pressurized liquid toward the outlet, whereby the reciprocating action of the piston delivers a predetermined metered quantity of volumetric liquid to said liquid utilizing device at a predetermined rate; and a motor connected to said drive, said motor being operably connected to said source of pressurized fluid and driven by fluid under pressure received therefrom.

2. A flow divider as defined in claim 1, wherein said housing defines a second outlet, said passageway defining member includes material defining a second passageway for intermittently placing said inlet in fluid communication with said second outlet, and including a second piston located in said second passageway.

3. A flow divider as defined in claim 2, wherein said first and second passageways and said first and second metering pistons are configured to output dissimilar volumes of pressurized hydraulic fluid.

4. A flow divider as defined in claim 1, wherein said housing, said passageway defining member, and said meter piston are configured to operate at a liquid operating pressure of above about 50 psi.

5. A flow divider as defined in claim 1, wherein said housing includes a second inlet configured for fluid-tight connection to a second source of pressurized liquid and a second outlet configured for fluid-tight connection to a second liquid utilizing device, wherein said passageway defining member includes a second passageway configured to interconnect said second inlet and second outlet, and a second piston operably positioned in said second passageway.

6. A flow divider as defined in claim 1, wherein said piston includes a hydraulic fluid seal for sealingly slideably engaging the passageway.

7. A flow divider as defined in claim 1, wherein the passageway includes a sidewall having a ring-shaped depression and a hydraulic fluid seal located in said sidewall depression for sealingly engaging the side of said piston.

8. A flow divider as defined in claim 1, including a motor connected to said drive for turning said passageway defining member at desired speed.

9. A flow divider as defined in claim 8, wherein the speed of said motor is variable.

10. A flow divider as defined in claim 1, wherein one of said piston and said passageway includes a longitudinally extending slot, and the other of said piston and said passageway includes a slot engaging pin, said piston-travel-limiting member including said slot engaging pin.

11. A flow divider as defined in claim 1, wherein said piston-travel-limiting member includes piston engaging snap rings located in one or more ring-shaped slots in said passageway.

12. A flow divider as defined in claim 1, wherein said housing defines a pair of sub-inlets connected to said inlet and also defines a pair of sub-outlets connected to said outlet, wherein said passageway defining member defines a pair of said passageways for intermittently placing said sub-inlets in fluid communication with said sub-outlets and wherein one of said metering pistons is located in each of said passageways such that the flow from said inlet to said outlet is increased substantially over use of a single passageway.

13. A flow divider as defined in claim 1, including a plurality of different passageway defining members that can be selected for installation into said cavity of said housing.

14. A flow divider as defined in claim 13, including a plurality of different housings that can be selected for receiving a selected passageway defining member.

15. A flow divider as defined in claim 1, wherein said passageway defining member includes a bore, and including a piston receiving tubular insert positioned in said bore, said tubular insert including an inner surface defining said passageway.

16. A flow divider as defined in claim 15, including a pair of said inserts positioned in opposing ends of said bore.

17. A flow divider as defined in claim 16, wherein said tubular inserts include threaded exterior surfaces configured to engage corresponding threads in the bore.

18. A flow divider as defined in claim 1, including a seal engaging said housing cavity and said passageway defining member to prevent undesirable leakage of pressurized liquid between said inlet and said outlet.

19. A flow divider as defined in claim 1, wherein said motor is connected to said inlet.

20. A flow divider for delivering metered amounts of volumetric liquid from a source of pressurized liquid to a liquid utilizing device requiring a supply of metered volumetric liquid under pressure, comprising:

a housing including material defining an inlet configured for connection to the source of pressurized liquid, an outlet configured for connection to the liquid utilizing device, and a cavity between said inlet and said outlet;

a passageway defining member rotatably positioned in said cavity of said housing, said passageway defining member intermittently placing said inlet and said outlet in fluid communication with a passageway in said passageway defining member as said passageway defining member is rotated;

a metering piston located in said passageway, said metering piston being configured to slide reciprocatingly back and forth in said passageway;

a piston-travel-limiting member for limiting the travel of said piston in said passageway to a predetermined distance;

a drive connected to said passageway defining member for rotating said passageway defining member, whereby, by continuously rotating said passageway defining member, said passageway is repeatedly reversed by the rotation of said passageway defining member so that said piston is repeatedly located proximate the inlet and is thereafter forced by incoming pressurized liquid toward the outlet, whereby the reciprocating action of the piston delivers a predetermined metered quantity of volumetric liquid to said liquid utilizing device at a predetermined rate;

said passageway defining member includes a bore, and including a piston receiving tubular insert positioned in said bore, said tubular insert including an inner surface defining said passageway;

a pair of said inserts positioned in opposing ends of said bore, said pair of inserts defining a gap therebetween; and a seal located in said gap.

21. A fluid flow metering system for delivering controlled amounts of pressurized fluid, comprising:

a housing including an inlet and at least one outlet;

a source of pressurized fluid connected to said inlet;

a fluid utilizing device requiring pressurized fluid connected to said at least one outlet;

a drive;

a spool rotatably positioned in said housing and operably connected to said drive, said spool including at least one passageway that periodically aligns with said inlet and said at least one outlet as said spool is rotated;

a piston positioned in said at least one passageway for reciprocating sliding movement within said passageway, whereby as said spool is rotated, said piston is moved by incoming fluid along said at least one passageway away from said inlet and toward said at least one outlet, and as said spool is further rotated, said piston is again positioned proximate said inlet and is again forced along said at least one passageway in an opposite direction, such that a metered volumetric flow of the pressurized fluid is passed at a controlled rate from said source to said fluid utilizing device; and a motor connected to said drive, said motor being operably connected to said source of pressurized fluid and driven by the pressurized fluid received therefrom.

22. A fluid flow metering system as defined in claim 21, wherein said housing includes a plurality of said outlets, wherein said spool includes a plurality of said passageways that periodically connect said plurality of said outlets to said inlet, and including a plurality of said pistons positioned in said passageways.

23. A fluid flow metering system as defined in claim 21, wherein said housing includes a pair of outlets and a pair of inlets, wherein said spool includes a pair of passageways that periodically connect said pair of inlets to said pair of outlets, respectively, including a pair of said pistons positioned in said pair of passageways.

24. A fluid flow metering system as defined in claim 23, wherein said fluid utilizing device includes a material mix head for mixing multi-component materials, said pair of outlets being connected to said mix head.

25. A fluid flow metering system as defined in claim 21, wherein said housing includes housing sections each defining one of said outlets that are configured for interconnection, and wherein said spool includes spool sections each defining one of said at least one passageway, said spool sections being configured for interconnection whereby said metering system is modular and can be assembled from a selected number of said housing sections and said spool sections.

26. A fluid flow metering system as defined in claim 21, wherein said fluid utilizing device includes a sprayer.

27. A fluid flow metering system as defined in claim 26, wherein said sprayer is one of an agricultural sprayer, an industrial sprayer, and a lawn and garden sprayer.

28. A method of dispensing liquid fluid comprising:

providing a housing including an inlet and an outlet, a spool rotatably positioned in the housing, the spool including a passageway for intermittently connecting the inlet to the outlet as the spool is rotated, and a floating piston located in the passageway;

supplying pressurized fluid having the viscosity of one of hydraulic fluid and water to the inlet;

dispensing a metered amount of said fluid from the outlet by rotating the spool so that the incoming pressurized fluid intermittently forces the piston to move thus dispensing fluid in the passageway; and providing a motor operably connected to said spool for rotating the spool and operably connected to said inlet, and wherein said step of supplying includes supplying pressurized fluid to the inlet such that the motor is motivated by said pressurized fluid in said inlet.

29. A method as defined in claim 28, wherein said step of dispensing includes dispensing liquid having the viscosity of one of pressurized hydraulic fluid and water.

30. An apparatus for delivering proportionate amounts of flowable substance comprising:

a first end member;

a second end member;

a plurality of housing sections configured to be positioned adjacent each other and between said first and second end members, each of said housing sections defining a cavity, an inlet to said cavity and an outlet from said cavity;

a plurality of spool sections configured to be positioned adjacent each other and interconnected to each other, each of said spool sections being movably positioned in one of said cavities and defining a passageway for intermittently connecting the inlet of said one cavity to the outlet of said one cavity;

a floating piston located in each of said passageways for metering fluid flow from the inlet to the outlet in each of said cavities;

a drive shaft connected to one of said spool sections, said drive shaft extending through said first end member; and a motor connected to said drive shaft for driving, said plurality of spools, said motor being operably connected to one of said inlets for receiving energy to motivate said motor.

31. An apparatus as defined in claim 30, wherein said inlets are positioned on said housing sections to align with and to communicate with the inlets on adjacent housing sections and including seals located between said plurality of housing sections to prevent undesirable leakage of the flowable substance.

32. An apparatus as defined in claim 30, wherein said housing sections and said spool sections form a subassembly and wherein one of said housing sections and said spool sections in each subassembly includes a seal for sealingly slideably engaging the other of said housing section and said spool section in said subassembly to prevent undesirable leakage of the flowable substance between said inlet and said outlet of said housing section in said subassembly.

33. A method of dividing fluid flow for providing pressurized fluid to pressurized fluid utilizing devices, comprising:

providing a housing including an inlet and an outlet, a passageway defining spool rotatingly mounted in the housing for periodically connecting the inlet to the outlet, and a free floating piston located in the passageway;

connecting a source of pressurized fluid to said inlet and a fluid utilizing device to said outlet;

communicating pressurized fluid to the inlet;

positioning a first end of the passageway adjacent the inlet such that the piston is forced away from the inlet and such that the fluid located within the passageway forced out the outlet under pressure;

rotating the spool so that a second end of the passageway opposite the first end is positioned adjacent the inlet so that the piston is moved in the opposite direction in the passageway and additional pressurized fluid is again moved out of said passageway and through said outlet, whereby the piston reciprocates in the passageway at a predetermined rate and dispenses fluid at a predetermined rate;

providing a motor operably connected to said spool for rotating the spool, said motor being operably connected to said inlet; and said step of supplying including supplying pressurized fluid to the inlet such that the motor is motivated by said pressurized fluid in said inlet.

34. A method as defined in claim 33, wherein said step of communicating includes supplying said pressurized fluid at a pressure above about 50 psi.

35. A method as defined in claim 33, wherein said step of communicating pressurized fluid includes supplying hydraulic fluid to said inlet.

36. A method as defined in claim 33, wherein said housing includes a second outlet, said spool includes a second passageway for periodically connecting the inlet to the second outlet, and including a second piston located in the second passageway, and including a step of delivering proportional amounts of fluid out of said first and second passageways as said spool is rotated.

37. A method as defined in claim 36, wherein said proportional amounts are not equal.

38. A method as defined in claim 36, wherein said housing includes a third outlet, said spool includes a third passageway for periodically connecting the inlet to the third outlet, and including a third piston located in the third passageway, and including steps of plugging said second outlet and of delivering proportional amounts of fluid out of said first and third passageways as said spool is rotated.

* * * * *